Aug. 20, 1929.   M. RACHLIN   1,725,369
CLOTHESLINE PULLEY
Filed March 31, 1928

INVENTOR
M. Rachlin
BY
Sigmund Herzog
ATTORNEY

Patented Aug. 20, 1929.

1,725,369

UNITED STATES PATENT OFFICE.

MAX RACHLIN, OF BROOKLYN, NEW YORK.

CLOTHESLINE PULLEY.

Application filed March 31, 1928. Serial No. 266,373.

The present invention relates to improvements in clothes line pulleys, and has for its main object to provide a device of this type in which the frame of the sheave is formed of one or more wire sections and the pin or spindle, on which the sheave turns, is made integral with said frame or with an element thereof.

Another object of the invention is to provide a device of this type which is simple in construction, efficient in operation, durable in use and capable of manufacture on a commercial scale, or in other words one which is not so difficult to make as to be beyond the reasonable cost of such a contrivance.

A further object of the invention is to produce a sheave of two sheet metal sections by stamping operations, and to so design the parts that they may be conveniently united, preferably, by spot welding.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1:
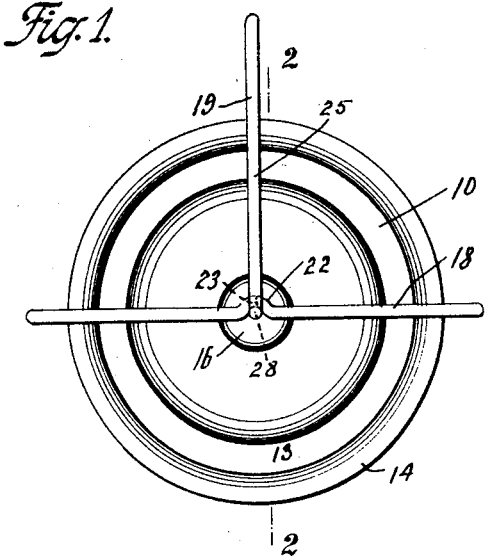
Figure 2:
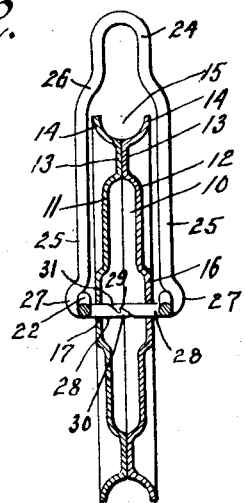
Figure 3:
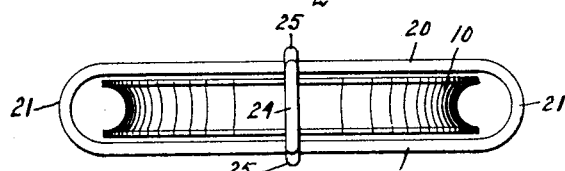

Figure 1 is a side elevation of the improved pulley; Fig. 2 is a section taken on line 2—2 of Fig. 1; and Fig. 3 is a top plan view thereof.

In the drawings, the numeral 10 indicates a sheave made of two sheet metal sections 11 and 12, each in the form of a dished disk. Adjacent its peripheral portion each of the disks is provided with an annular plane section 13, and beyond the last-mentioned section with a concave rim portion 14. In assembling the two disks, their plane sections 13 are placed in contact with one another, their dished portions then extending in opposite directions. The concave rim portions also extend oppositely, thereby forming a peripheral groove 15 over which the clothes line is adapted to run. The two disks are united by spot welding the same at the contacting plane sections 13 thereof. Each disk is provided centrally with an outwardly projecting hub portion 16, and these hub portions are each provided centrally with a hole 17, the said holes being in alignment and adapted to receive a pin or spindle upon which the sheave turns.

The sheave is mounted upon a frame made of wire and includes, generally speaking, a sheave enclosing member 18 and a strap member 19. The sheave enclosing member constitutes a side guard to prevent the clothes line from running off the sheave. It is made of a single piece of wire bent substantially like an ellipse and includes two straight portions 20, which extend diametrically across the sheave adjacent the opposite outer faces of the latter, the rounded ends 21 thereof projecting beyond the sheave, as clearly shown in Figs. 1 and 3 of the drawings. Centrally the straight portions 20 of the member 18 are bent upwards, as indicated at 22, to form substantially semi-circular elements around the openings 17 in the sheave. The element 18 is endless, the abutting ends of the wire piece, of which the said element is formed, being spot welded at 23 in one of the bends 22 (Fig. 1).

The strap member 19 comprises a piece of wire, bent to approximately U-shape at its center to form a loop 24, by means of which the pulley may be suspended from a hook or the like. Beyond the loop the two arms 25 of the wire are offset outwardly, as at 26, so as to space the two arms sufficiently apart to receive the sheave between them. These arms extend parallel to the outer faces of the sheave radially in relation to the latter and at right angles to the frame element 18. The arms 25 are bent outwards into substantially semi-circular shape, as indicated at 27, and thence inwards toward each other, as shown at 28, the inwardly bent sections 28 extending through the openings 17 in the sheave and their ends being interlocked, as indicated at 29, within the sheave. The interlocking means comprises on each end of the strap member a hook-shaped element 30, which is, preferably, formed by oppositely tapering the said ends and providing adjacent each end a notch 31. The notches extend in opposite directions, so that, when the inwardly bent portions 28 of the strap are forced toward one another, the hook portion of each end is seated in the notch of the other end, thereby preventing disengagement of the said ends. As appears from Fig. 2 of the drawings, the substantially semi-circular bends 22 of the portions 20 of the frame element 18 rest upon the inwardly bent sections 28 of the strap member and are partly surrounded by the substantially semi-circular bends 27 of the arms 25.

The strap member is united with the frame element by spot welding at the contacting bends 22 and 27 of the frame element and strap member, respectively. The inwardly bent sections 28 of the strap member constitute the pin or spindle of the sheave.

When the elements are assembled in the manner above described, the offsets 26 of the strap member lie close to the sheave and prevent the clothes line, which may climb either rim, from entering between the sheave and the strap member.

What I claim is:—

1. A clothes line pulley comprising a sheave, a frame enclosing said sheave and extending diametrically across the same, said frame being provided centrally with registering substantially semi-circular bends, a strap member radially enclosing said sheave extending at right angles to said frame and being provided with a pin portion on which said sheave is adapted to turn, said strap member being provided with outwardly extending registering substantially semi-circular sections extending around and engaging the substantially semi-circular bends of said frame, said frame and strap member being each made of a single piece of wire, both ends of said frame and the outer end of said strap member extending beyond the periphery of said sheave to hold the clothes line in the sheave groove.

2. In a device according to claim 1, said frame being endless and united with said strap member by spot welding.

3. In a device according to claim 1, the ends of the wire piece of said strap member meeting within the hub portion of said pulley, and means on said ends for locking the same together.

Signed at New York, in the county of New York, and State of New York, this 27th day of March, A. D. 1928.

MAX RACHLIN.